US012576438B2

(12) United States Patent
Valsecchi

(10) Patent No.: US 12,576,438 B2
(45) Date of Patent: Mar. 17, 2026

(54) APPARATUS FOR THE ORBITAL CUTTING AND CALIBRATION OF TUBES

(71) Applicant: BLM S.P.A., Cantu' (IT)

(72) Inventor: Cristian Valsecchi, Mandello del Lario (IT)

(73) Assignee: BLM S.p.A., Cantù (IT)

( * ) Notice: Subject to any disclaimer, the term of this patent is extended or adjusted under 35 U.S.C. 154(b) by 1074 days.

(21) Appl. No.: 17/434,260

(22) PCT Filed: Feb. 26, 2020

(86) PCT No.: PCT/IB2020/051621
§ 371 (c)(1),
(2) Date: Aug. 26, 2021

(87) PCT Pub. No.: WO2020/174409
PCT Pub. Date: Sep. 3, 2020

(65) Prior Publication Data
US 2022/0134403 A1     May 5, 2022

(30) Foreign Application Priority Data

Feb. 27, 2019    (IT) ........................ 102019000002815

(51) Int. Cl.
*B21D 3/14*          (2006.01)
*B21D 41/02*        (2006.01)
(Continued)

(52) U.S. Cl.
CPC ............... *B21D 3/14* (2013.01); *B21D 41/02* (2013.01); *B23B 27/045* (2013.01);
(Continued)

(58) Field of Classification Search
CPC ........ B21D 3/14; B21D 41/02; B23B 27/045; B23B 27/08; B23D 21/006; B23D 21/04; B26D 3/166
See application file for complete search history.

(56) References Cited

U.S. PATENT DOCUMENTS

| | | |
|---|---|---|
| 4,430,913 A | 2/1984 | Williamson |
| 5,531,370 A | 7/1996 | Rohrberg |
| (Continued) | | |

FOREIGN PATENT DOCUMENTS

| | | |
|---|---|---|
| KR | 20150137871 A | 12/2015 |

OTHER PUBLICATIONS

International Search Report, issued in PCT/IB2020/051621, mailed Jun. 15, 2020, Rijswijk, Netherlands.
(Continued)

*Primary Examiner* — Sara Addisu
(74) *Attorney, Agent, or Firm* — Cittone Demers & Ameri LLP; Henry J. Cittone

(57) ABSTRACT

An apparatus for the orbital cutting and calibration of tubes is provided. The apparatus has a rotor having a central hole through which a tube to be cut is movable along its longitudinal axis, the rotor being drivable to rotate about a first axis of rotation coinciding in use with the longitudinal axis of the tube that is supplied to the apparatus. The apparatus has a cutting device having a first support body mounted radially movable on the rotor and a cutting tool carried by the first support body, and a calibration device having a second support body mounted to be radially movable on the rotor and a calibration tool carried by the second support body.

6 Claims, 5 Drawing Sheets

(51) Int. Cl.
    B23B 27/04       (2006.01)
    B23D 21/00       (2006.01)
    B23D 21/04       (2006.01)
    B26D 3/16        (2006.01)
    B23B 27/08       (2006.01)

(52) U.S. Cl.
    CPC ........... B23D 21/006 (2013.01); B23D 21/04
        (2013.01); B26D 3/166 (2013.01); *B23B 27/08*
                                      (2013.01)

(56)                   References Cited

U.S. PATENT DOCUMENTS 5,549,024 A *   8/1996  Ricci ................... B23Q 9/0021
                                                  82/101
  10,166,614 B2 *   1/2019  Choi ...................... B23D 21/00
2016/0121406 A1    5/2016  Weinberg
2016/0297009 A1  10/2016  Coakley

OTHER PUBLICATIONS

Written Opinion of the International Searching Authority, issued in
PCT/IB2020/051621, mailed Jun. 15, 2020.

* cited by examiner

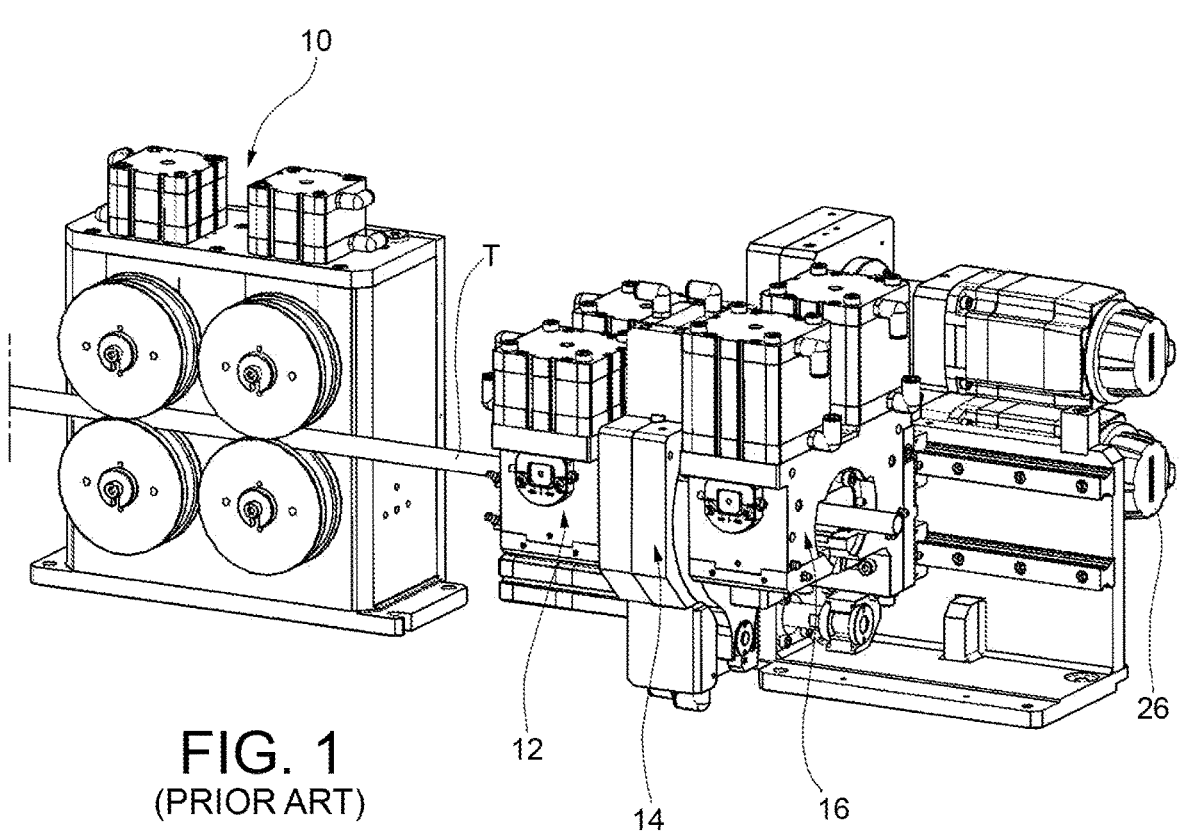
FIG. 1
(PRIOR ART)
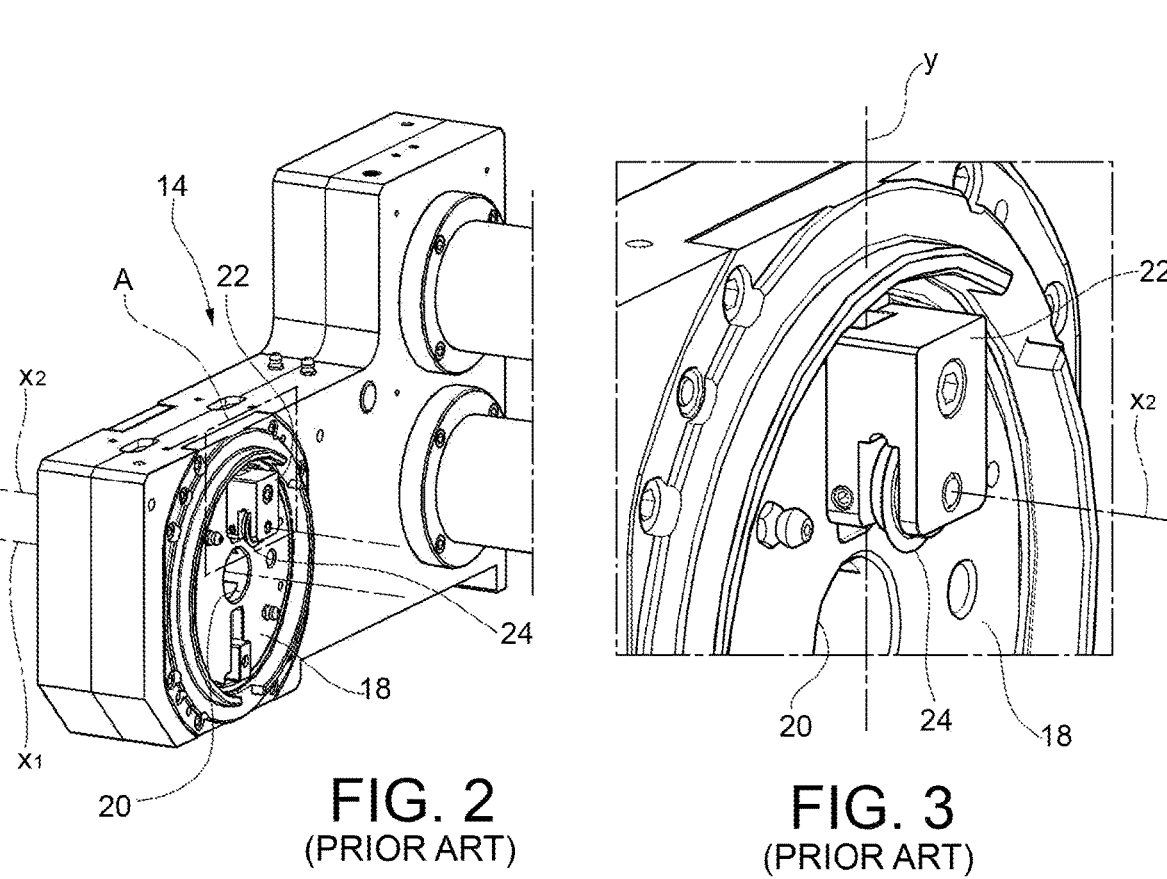
FIG. 2
(PRIOR ART)
FIG. 3
(PRIOR ART)

APPARATUS FOR THE ORBITAL CUTTING AND CALIBRATION OF TUBES

CROSS-REFERENCE TO RELATED APPLICATIONS

This application is a National Phase Application of PCT International Application No. PCT/IB2020/051621, having an International Filing Date of Feb. 26, 2020, claiming priority to Italian Patent Application No. 102019000002815, filed Feb. 27, 2019, each of which is hereby incorporated by reference in its entirety.

FIELD OF THE INVENTION

The present invention concerns an apparatus for the orbital cutting of tubes and for the calibration of the tubes themselves after cutting.

BACKGROUND OF THE INVENTION

The so-called orbital cutting process is known for cutting tubes with a circular cross-section, e.g. tubes subjected to bending on tube bending machines or tubes subjected to deformation of the ends on tube end-forming machines.

The orbital cutting of a circular cross-section tube is an operation without chip removal that is performed by operating a circular cutter, commonly known as a cutting roller, to perform a number of revolutions about the tube, progressively scoring the tube in order to allow a piece of tube to separate from the originating bar or coil. The tube piece is then separated from the bar, or coil, in one of the following ways already known:

- through-cut, according to which the cutting roller progressively scores the pipe to completely pass through its thickness;
- score and break, whereby the cutting roller progressively scores the tube without passing through its thickness and the separation of the piece is carried out through a tension action applied during the advancement of the cutting roller or immediately afterwards; and
- score and snap, according to which the cutting roller progressively grooves the tube without passing through its thickness and the separation of the piece takes place through a flexing action.

FIG. 1 of the accompanying drawings shows a known example of a line for feeding and cutting tubes, comprising a feeding unit 10 for feeding a bar of tube T (possibly originating from a tube coil which is turned and straightened), a clamping unit 12 for clamping the tube T, a cutting unit 14 for the orbital cutting of the tube T and a breaking unit 16 for breaking a piece of tube T after cutting by the cutting unit 14. The breaking unit 16 may also not be provided or not used if the separation of the tube piece is carried out by means of the aforementioned through-cut method.

The cutting unit 14 is shown specifically in FIGS. 2 and 3 of the accompanying drawings, where FIG. 3 shows in enlarged scale the detail A of FIG. 2.

With reference to FIGS. 2 and 3, the cutting unit 14 comprises a rotor 18 with a central hole 20 through which is passed the tube T for cutting. The rotor 18 is fitted with a support body 22 carrying a cutting roller 24. The rotor 18 is driven to rotate, for example by a gearmotor unit comprising an electric motor 26, about a first axis of rotation x1 coinciding with the longitudinal axis of the tube T. The support body 22 is movable in the radial direction (indicated at y) with respect to the rotor 18. The cutting roller 24 is freely rotatable about a second axis of rotation x2 parallel to the first axis of rotation x1 with respect to the support body 22.

With reference to FIGS. 4 to 7 of the accompanying drawings, the cutting process of the tube T by means of a cutting unit such as the one illustrated in FIGS. 2 and 3, is carried out according to the following steps (considering for simplicity the through cutting technique for the separation of the tube piece from the tube bar fed by the feeding unit 10).

Initially (FIG. 4) the tube T is moved axially (i.e. in the direction of the longitudinal axis of the tube, which, as said, coincides with the axis of rotation x1 of the rotor 18) until the section of the tube T wherein the cut is to be made is positioned at the cutting roller 24.

At this point (FIG. 5), the cutting roller 24 is brought into contact with the surface of the tube T, causing the support body 22 to translate radially towards the longitudinal axis of the tube T, and the rotor 18 is driven to rotate about the first axis of rotation x1, so that the cutting roller 24 performs a series of revolutions about the tube T.

As shown in FIG. 6, during the rotation movement of the rotor 18, the support body 22, and therefore the cutting roller 24 carried thereby, is translated radially towards the longitudinal axis of the tube T, so that the cutting roller 24 produces a progressively deeper circumferential groove C in the thickness of the tube, until it causes the separation of a piece of tube (indicated at P).

Finally, as shown in FIG. 7, the rotation of the rotor 18 is interrupted and the cutting roller 24 is returned to the radial starting position, away from the surface of the tube T.

The orbital cutting process is affected by the drawback that the thrust of the cutting roller from the outside of the tube inwards generates a displacement of material in a radial direction, towards the inside of the tube, with a consequent reduction in the internal diameter of the same tube. In addition to the reduction of the inner diameter of the tube due to the decrease of the outer diameter of the tube, the reduction of the inner diameter of the tube due to the formation of burrs must also be considered.

The reduction of the inner diameter of the tube is an undesirable effect of cutting, both because it may affect the subsequent operations on the tube, in particular any bending of the tube using a core (the decrease in the inner diameter of the tube in the area surrounding the cut requires the use of a core with a smaller diameter than the inner diameter of the tube, with a resulting risk of bending defects), and because it may affect the very functionality of the finished product.

The extent to which the inner diameter of the tube is reduced as a result of orbital cutting is closely correlated to numerous factors, linked both to the geometry of the tool (such as size, rake angles, sharpness—however, the latter is liable to decrease with use), to the cutting parameters (e.g. penetration speed) and to the mechanical and metallurgical characteristics of the tube being worked.

Due to the many factors involved, it is not always possible to keep the reduction of the inner diameter of the tube constantly within acceptable limits during the operation.

Therefore, it is known to carry out, after the orbital cut, in a special unit placed downstream of the cutting unit, a calibration operation on the cut tube piece aimed at bringing the internal diameter of the tube back to the nominal value. The calibration operation may, for example, consist of a trimming or deburring operation.

However, this solution is not optimal, as it increases the costs, size and complexity of the plant, due to the need to provide a special processing unit, as the tube must be properly handled between the cutting unit and the calibration unit, as well as the need to properly handle the waste resulting from the calibration operation. Moreover, the execution of this additional operation involves an increase in cycle time, which consequently penalizes the productivity of the processing plant (e.g. bending) of the tubes.

It is also known to perform the calibration operation according to the so-called "push" technique, i.e. using a special punch that is positioned coaxially with respect to the tube and pushed inside the tube for a certain distance, for example a few millimeters, so as to cause a calibrated enlargement of the inner diameter of the tube. While overcoming some of the negative aspects of calibration by squaring, push calibration has the disadvantage of displacing the burr inside the tube, which may create problems in the subsequent steps of working the tube or in the final use of the tube itself.

SUMMARY OF THE INVENTION

The object of the present invention is therefore to provide an apparatus for the orbital cutting of tubes and the calibration thereof after cutting, which is not affected by the drawbacks of the prior art highlighted above.

This and other objects are achieved by an apparatus as described and claimed herein.

Advantageous embodiments of the invention are specified in the dependent claims, the content of which is to be understood as an integral part of the description which follows.

In short, the invention is based on the idea of creating an apparatus for the cutting and calibration of tubes comprising:

- a rotor having a central hole through which the tube to be cut is to be moved, the rotor being drivable to rotate about a first axis of rotation;
- a cutting device including a first support body which is mounted so as to be radially movable on the rotor, and a cutting tool which is carried by said first support body; and
- a calibration device including a second support body which is mounted so as to be radially movable on the rotor and a calibration tool which is carried by said second support body;
- wherein the calibration tool is movable radially outwards to produce an enlargement of the inner diameter of a piece of the tube.

Due to the fact that the apparatus comprises a cutting device and a calibration device mounted on the same rotor, the use of an additional processing unit downstream of the cutting unit to carry out the tube calibration after cutting is avoided and therefore all the aforementioned drawbacks related to the presence of this additional processing unit are avoided. Moreover, due to the fact that the calibration tool is mounted on a support body which is radially movable with respect to the rotor, and therefore with respect to the tube being worked, the calibration of the tube is carried out by means of a radial movement of the tool with respect to the tube, instead of an axial movement (i.e. a direct movement along the longitudinal axis of the tube), as happens in push calibration, and therefore the drawback of displacing the burr inside the tube typical of push calibration is avoided.

Preferably, the first support body and the second support body are separate bodies and are mounted on the rotor so that they may be moved in the same radial direction.

Alternatively, however, it is possible to provide a single support body carrying both the cutting tool and the calibration tool.

According to one embodiment, in order to drive the radial movement of the first and second support body (and thus of the cutting and calibration tools) with respect to the rotor (and thus with respect to the tube), the apparatus comprises a single driving device paired with both the first support body and the second support body in such a way as to control the radial movement of said bodies symmetrically with respect to the axis of rotation of the rotor (i.e. with respect to the longitudinal axis of the tube). Alternatively, a first and a second driving device may be provided, each paired with a respective support body, so that the radial movement of the first and of the second support body may be driven independently of each other.

Preferably, the cutting tool is formed by a roller which is mounted on said first support body so as to be idly rotatable about a second axis of rotation parallel to said first axis of rotation and has a circumferential cutting edge.

As far as the calibration tool is concerned, it may be configured to enlarge the tube by plastic deformation or alternatively by chip removal. In this second case, the calibration tool will be fitted with a cutting edge suitably shaped to work the free end of the tube.

A further subject-matter of the invention is a machine for working tubes, such as a machine for straightening and cutting tubes from a coil, comprising an apparatus for cutting and calibrating tubes having the aforementioned features.

According to one embodiment, the machine is configured to perform the following steps:

- with the rotor in rotation, cutting the piece from the tube by means of the cutting tool;
- displacing the piece axially to move it away from the remaining part of the tube;
- displacing the calibration tool radially towards the longitudinal axis of the tube until it reaches a predetermined position within the radial dimensions of the tube;
- displacing the piece axially towards the calibration tool;
- with the rotor in rotation, moving the calibration tool radially outwards to produce an enlargement of the inner diameter of the piece.

BRIEF DESCRIPTION OF THE DRAWINGS

Further features and advantages of the present invention will become more apparent from the detailed description that follows, provided purely by way of non-limiting example with reference to the accompanying drawings, wherein:

FIG. 1 is a perspective view showing a line for feeding and cutting tubes according to the prior art;

FIG. 2 is a perspective view showing the cutting unit of the feeding and cutting line in FIG. 1;

FIG. 3 shows, in enlarged scale, the detail A of FIG. 2;

DETAILED DESCRIPTION

Figures 4, 5, 6, 7:
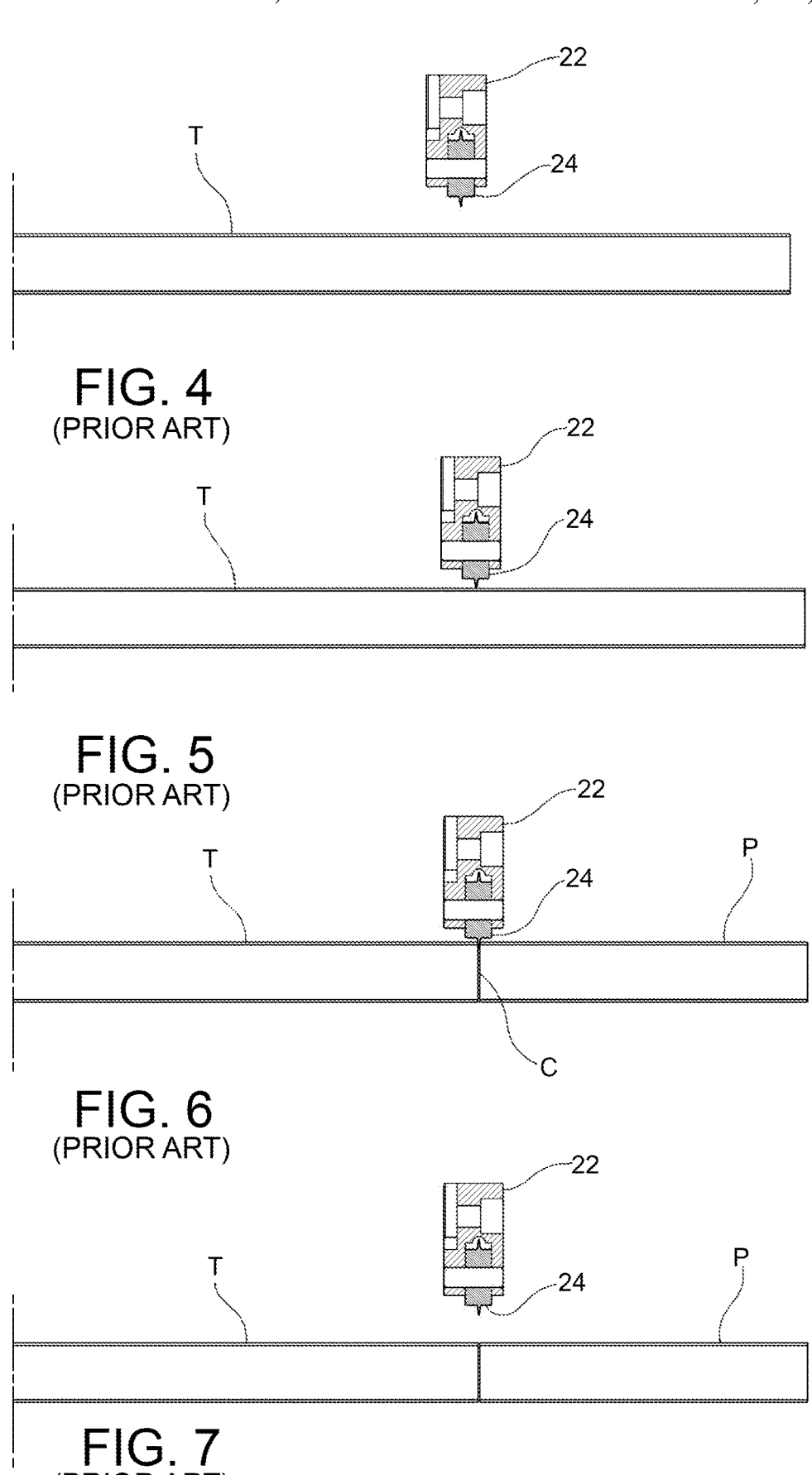
FIGS. 4 to 7 show in sequence some steps in the process of cutting a tube using the cutting unit in FIGS. 2 and 3.
Figure 8:
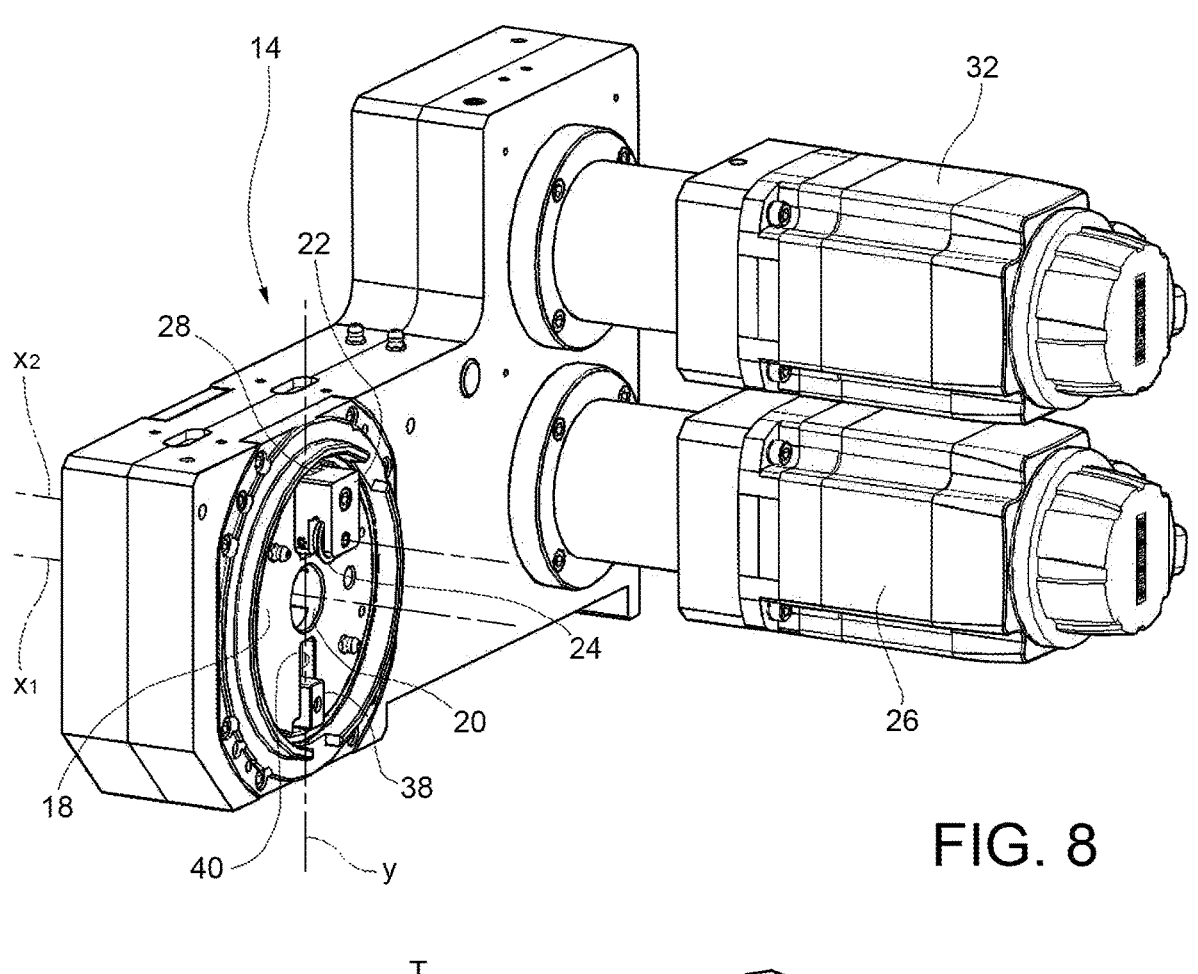
FIG. 8 is a perspective view of an apparatus for cutting tubes and calibrating them after cutting, according to an embodiment of the present invention.
Figure 9:
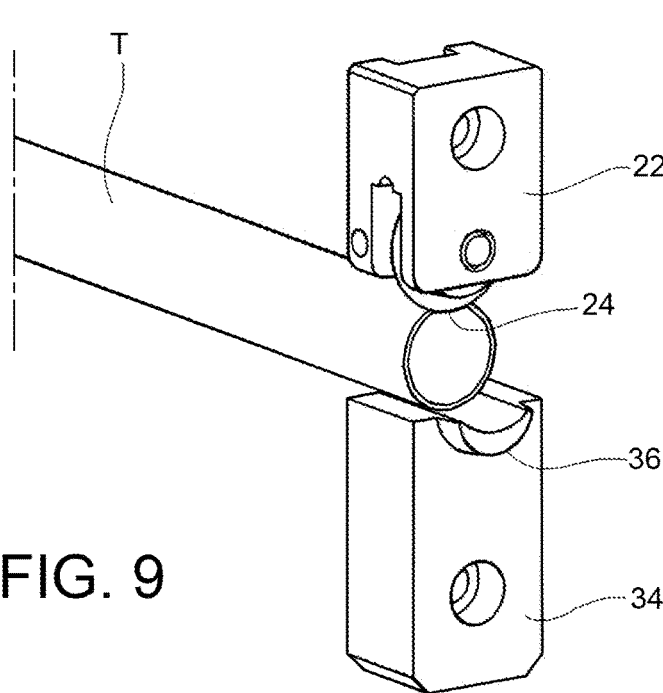
FIG. 9 is a perspective view showing in detail the cutting and calibration devices of the apparatus in FIG. 8.
Figure 10:
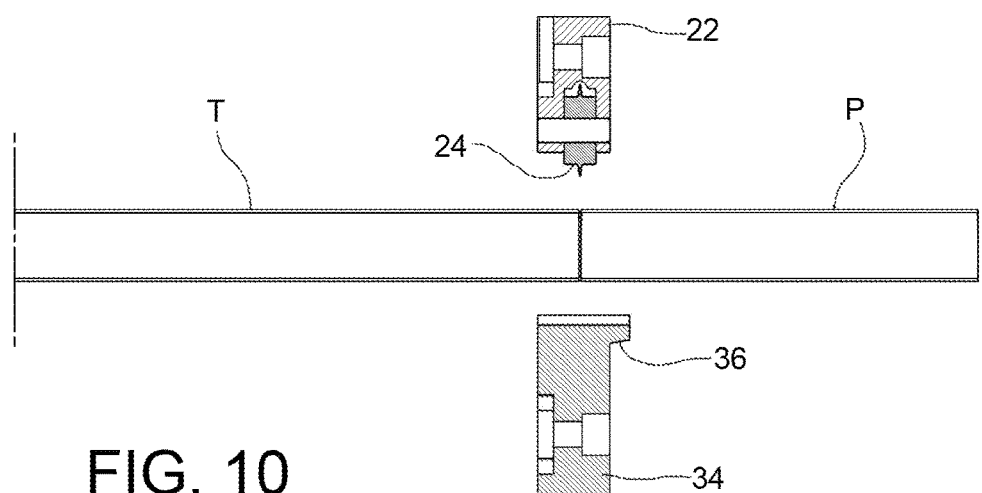
FIGS. 10 to 16 show in sequence some steps of the process for calibrating a tube using the apparatus in FIG. 8.
Figure 11:
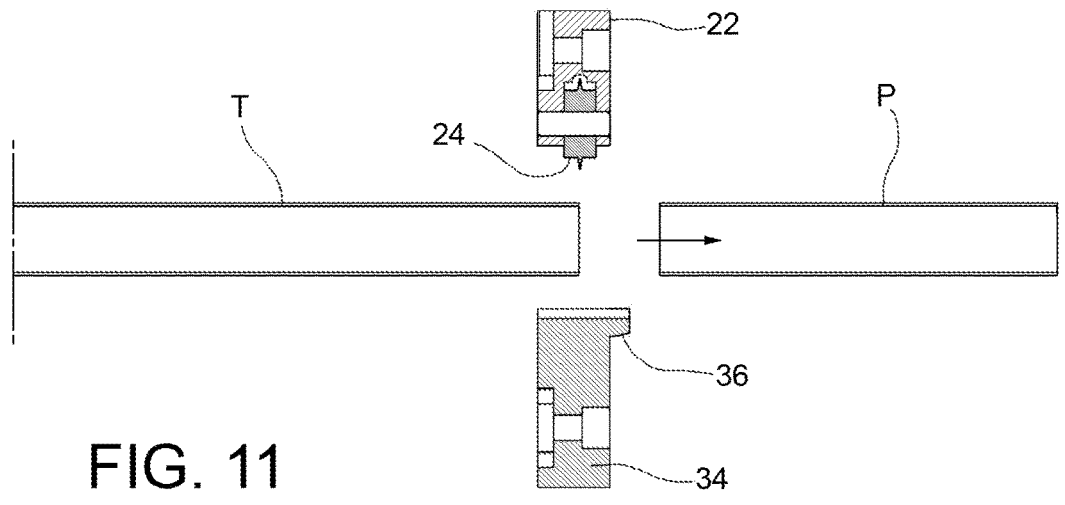

With reference initially to FIGS. 8 and 9, where parts and elements identical or corresponding to those in FIGS. 1 to 7

(prior art) have been assigned the same reference numbers, a cutting and calibration apparatus (hereinafter simply indicated for convenience as "apparatus") is indicated collectively at 14 adapted to carry out in sequence the cutting of a tube T and the calibration of the tube piece P thus cut in order to bring the inner diameter of the tube piece P back to its initial value (nominal diameter).

The apparatus 14 comprises a rotor 18 with a central hole 20 through which the tube T to be cut is moved along its longitudinal axis by means of a feeding unit (not shown here, but of a type known per se—see for example the feeding unit 10 in FIG. 1). The rotor 18 is supported to rotate about a first axis of rotation x1 coinciding with the longitudinal axis of the tube T. The apparatus 14 further comprises a first driving device 26 (e.g. an electric gearmotor) to drive the rotor 18 to rotate about the first axis of rotation x1.

The rotor 18 is fitted with a support body 22 carrying a cutting tool 24, constructed for example as a roller with a sharp circumferential edge. The cutting tool 24 is freely rotatable about a second axis of rotation x2 parallel to the first axis of rotation x1, with respect to the support body 22.

The support body 22 is movable with respect to the rotor 18 along a radial direction y. In this respect, the support body 22 is for example rigidly connected to a slider 28 slidably mounted in a slot 30 of the rotor 18 extending along the radial direction y. A second driving device 32 (e.g. an electric gearmotor) is paired with the support body 22, or rather with the slider 28, to drive the translation movement of the slider 28, and therefore of the support body 22, along the radial direction y.

According to the invention, the apparatus 14 comprises, in addition to the cutting device formed by the cutting tool 24 and the support body 22 thereof, a calibration device including a support body 34 and a calibration tool 36 carried by the support body 34.

The support body 34 is mounted radially movable on the rotor 18, preferably along the same radial direction y along which the support body 22 carrying the cutting tool 24 may move. Preferably, the support body 34 is rigidly connected to a slider 38 mounted slidable in a slot 40 of the rotor 18 extending along the radial direction y on the side opposite to the slot 30 with respect to the axis of rotation x1 of the rotor 18.

The support body 34, or rather the slider 38, is also paired with a driving device to drive the translation movement of the slider 38, and therefore the support body 34, along the radial direction y. Preferably, the slider 38 is driven by the same driving device 32 which also drives the slider 28, so that the two sliders 28 and 38, and with them the related support bodies 22 and 34, are moved exactly symmetrically with respect to the axis of rotation x1 of the rotor 18, i.e. with respect to the longitudinal axis of the tube T.

The tube T is cut using the cutting tool 24 in the same way as explained above with reference to the prior art (see FIGS. 4 to 7 and the related description).

With reference to FIGS. 10 to 16, it will now be described a possible way of carrying out the operation of calibrating the newly cut piece of tube with an apparatus according to the present invention, an operation which—as said—serves to return the inner diameter of the tube piece at the cutting zone to the initial value (nominal diameter) in order to compensate the effect of reducing the inner diameter of the tube produced as a result of the cutting operation.

Figure 12:
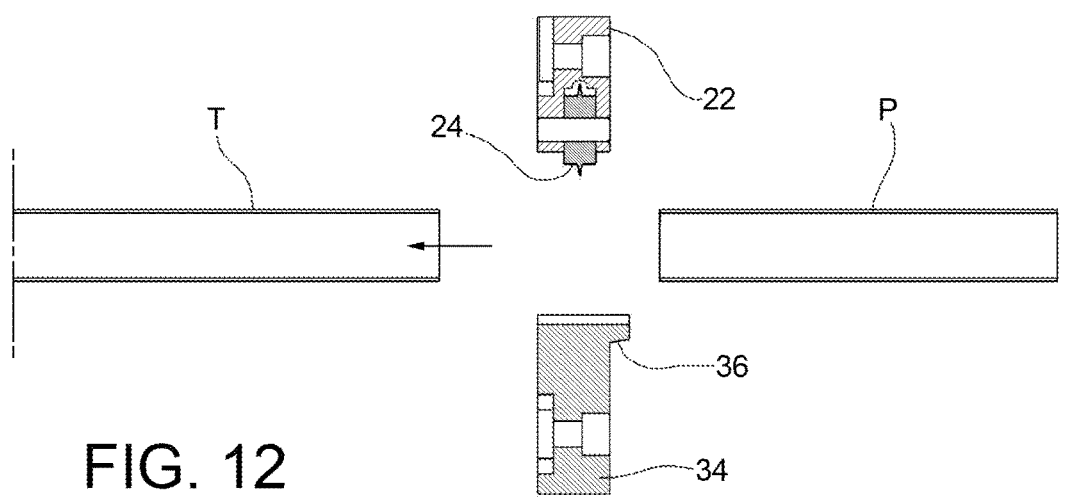

With the calibration tool 36 in a generic starting position (FIG. 10) and after having axially displaced (if necessary by means of a special breaking unit) the newly cut tube piece P so as to move it away from the remaining part of the tube bar T (FIG. 11), the tube T is retracted by means of the feeding unit (not shown here) so as to emerge from the axial dimensions of the cutting and calibration devices (FIG. 12).

Figure 13:
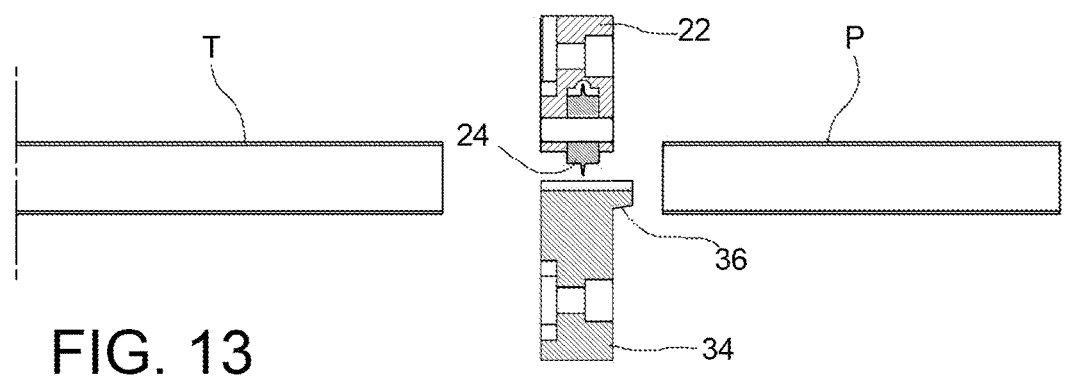

At this point, as shown in FIG. 13, the calibration tool 36 is displaced radially towards the longitudinal axis of the tube until it reaches a predetermined position. In the example shown, wherein there is provided only one driving unit for both cutting and calibration devices, the cutting tool 24 as a result is also displaced in a radial direction towards the longitudinal axis of the tube, but in the case of independent movements of the two tools it could of course be kept stationary in the starting position, as it does not intervene during the calibration operation.

Figure 14:
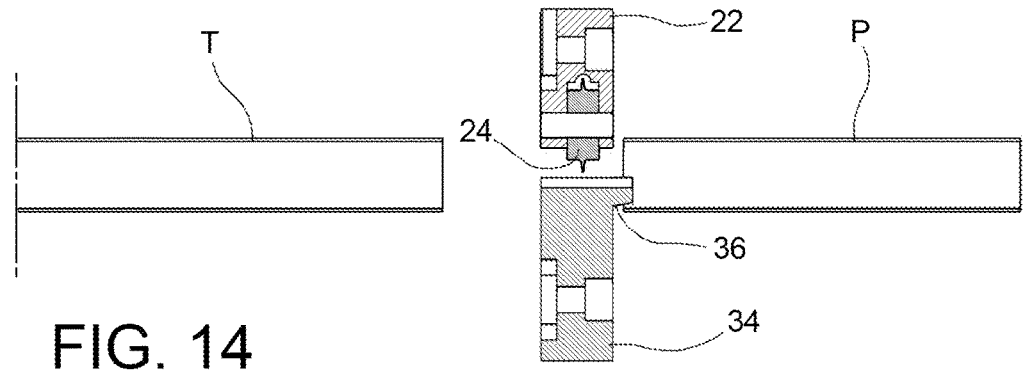

Subsequently, the tube piece P is moved axially towards the calibration tool 36 until it reaches a position of use for operating this tool (FIG. 14).

Figure 15:
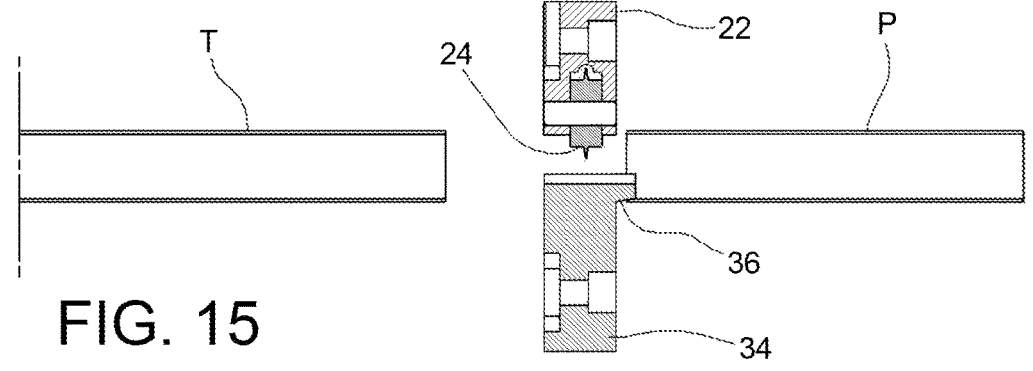

At this point, the rotor 18 is made to rotate (even if it is possible that the rotor is maintained continuously in rotation in the previous steps described above, possibly with a different speed from the speed used during the actual calibration operation), and at the same time the calibration tool 36 is appropriately moved outwards in a radial direction to a predetermined position (or with a predetermined force), in order to produce the necessary enlargement of the inner diameter of the tube piece P (FIG. 15). As mentioned previously, the calibration tool 36 may be arranged so as to perform the calibration by plastic deformation of the tube, as in the example shown here, or alternatively it may be arranged so as to perform the calibration by chip removal.

Figure 16:
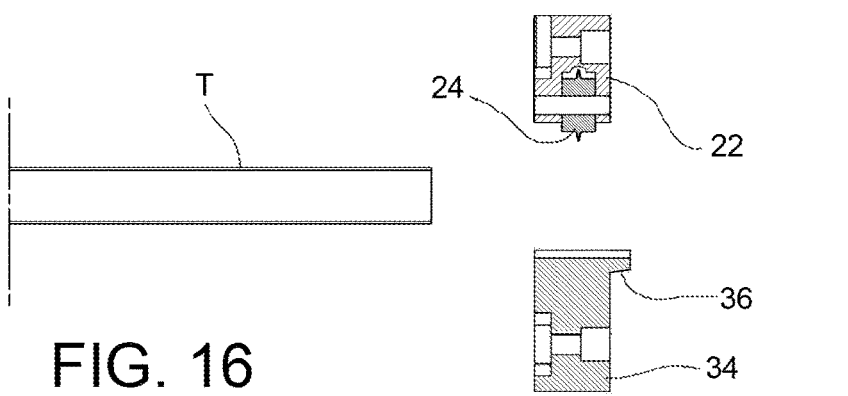

Finally, as shown in FIG. 16, once the calibration operation is finished, the newly worked tube piece is unloaded and the calibration tool 36 is moved radially outwards out of the radial dimensions of the tube T until it reaches the starting position.

As is evident from the description given above, with an apparatus according to the present invention it is possible to carry out the calibration operation immediately after cutting the tube, thus reducing the cycle time to a minimum. It is in effect no longer necessary to displace the newly cut tube piece to another workstation specifically dedicated to the calibration of the tube. Moreover, the integration of the calibration tool and the cutting tool in the same apparatus greatly simplifies the plant and reduces manufacturing costs and space requirements.

Naturally, without altering the principle of the invention, the embodiments and the details of implementation may vary widely with respect to those described and illustrated purely by way of non-limiting example, without thereby departing from the scope of the invention as defined in the accompanying claims.

The invention claimed is:

1. An apparatus for orbital cutting and calibration of tubes, the apparatus comprising
   a rotor having a central hole through which a tube to be cut is movable along its longitudinal axis, the rotor being drivable to rotate about a first axis of rotation (x1) coinciding in use with the longitudinal axis of the tube that is supplied to the apparatus;
   a cutting device comprising a first support body mounted radially movable on the rotor, and a cutting tool carried by said first support body; and
   a calibration device comprising a second support body mounted radially movable on the rotor, and a calibration tool carried by said second support body,
   wherein the calibration tool is movable in a radial direction (outwards to produce an enlargement of an inner diameter of a piece of the tube, wherein said first support body and second support body are separate from one another and are mounted on the rotor so as to be movable along a same radial direction, and wherein the apparatus further comprises a single driving device paired both to said first support body and to said second support body to drive a movement of said first and second support bodies along said radial direction (y) in a symmetrical manner with respect to said first axis of rotation (x1).

2. The apparatus of claim 1, wherein the cutting tool is formed by a roller mounted on said first support body so as to be idly rotatable about a second axis of rotation (x2) parallel to said first axis of rotation (x1) and has a circumferential cutting edge.

3. The apparatus of claim 1, wherein the calibration tool is configured to widen said piece of the tube by plastic deformation.

4. The apparatus of claim 1, wherein the calibration tool is provided with a cutting edge shaped to widen said piece of the tube by chip removal.

5. A machine for straightening and cutting tubes from a coil, comprising an apparatus for orbital cutting and calibration of tubes, the apparatus comprising a rotor having a central hole through which a tube to be cut is movable along its longitudinal axis, the rotor being drivable to rotate about a first axis of rotation (x1) coinciding in use with the longitudinal axis of the tube that is supplied to the apparatus;

a cutting device comprising a first support body mounted radially movable on the rotor, and a cutting tool carried by said first support body; and a calibration device comprising a second support body mounted radially movable on the rotor, and a calibration tool carried by said second support body, wherein the calibration tool is movable in a radial direction outwards to produce an enlargement of an inner diameter of a piece of the tube, wherein said first support body and second support body are separate from one another and are mounted on the rotor so as to be movable along a same radial direction, and wherein the apparatus further comprises a single driving device paired both to said first support body and to said second support body to drive a movement of said first and second support bodies along said radial direction (y) in a symmetrical manner with respect to said first axis of rotation (x1).

6. The machine of claim 5, said machine being configured to perform the following steps:

with the rotor in rotation, cutting the piece from the tube by the cutting tool;

displacing the piece axially to move the piece away from a remaining part of the tube;

displacing the calibration tool radially towards the longitudinal axis of the tube until the calibration tool reaches a predetermined position within radial dimensions of the tube;

displacing the piece axially towards the calibration tool; and with the rotor in rotation, moving the calibration tool radially outwards to produce the enlargement of the inner diameter of the piece of the tube.

* * * * *